US011687362B2

(12) United States Patent
Gershgorn et al.

(10) Patent No.: US 11,687,362 B2
(45) Date of Patent: Jun. 27, 2023

(54) STORAGE AND REUSE OF COMPUTING-TASK OUTPUTS USING SYSTEM-CALL INTERCEPTION

(71) Applicant: INCREDIBUILD SOFTWARE LTD., Tel Aviv (IL)

(72) Inventors: Victor Gershgorn, Tel-Aviv (IL); Boris Gimelbrand, Petah-Tikva (IL); Doron Exterman, Ramat Gan (IL)

(73) Assignee: INCREDIBUILD SOFTWARE LTD., Tel Aviv (IL)

( * ) Notice: Subject to any disclaimer, the term of this patent is extended or adjusted under 35 U.S.C. 154(b) by 294 days.

(21) Appl. No.: 17/237,094

(22) Filed: Apr. 22, 2021

(65) Prior Publication Data
US 2022/0342696 A1    Oct. 27, 2022

(51) Int. Cl.
*G06F 9/46* (2006.01)
*G06F 9/48* (2006.01)

(52) U.S. Cl.
CPC .................................. *G06F 9/4843* (2013.01)

(58) Field of Classification Search
CPC ..................................................... G06F 9/4843
See application file for complete search history.

(56) References Cited

U.S. PATENT DOCUMENTS

| | | |
|---|---|---|
| 7,086,063 B1 | 8/2006 | Ousterhout et al. |
| 7,168,064 B2 | 1/2007 | Ousterhout et al. |
| 7,263,695 B1 | 8/2007 | Muzaffar et al. |
| 7,395,529 B1 | 7/2008 | Stanton et al. |
| 7,539,976 B1 | 5/2009 | Ousterhout et al. |
| 7,676,788 B1 | 3/2010 | Ousterhout et al. |
| 7,725,524 B2 | 5/2010 | Ousterhout et al. |
| 7,886,265 B2 | 2/2011 | Ousterhout et al. |
| 8,042,089 B2 | 10/2011 | Ousterhout et al. |
| 9,069,644 B2 | 6/2015 | Melski et al. |
| 10,061,577 B2 | 8/2018 | Melski |
| 2017/0329629 A1 | 11/2017 | Maruyama |
| 2018/0136983 A1 | 5/2018 | Bequet et al. |

OTHER PUBLICATIONS

Kirillov, "Faster Builds with the new Caching Shader Preprocessor (Experimental)", Unity Blog, pp. 1-14, May 6, 2020.
Matev, "Fast Distributed Compilation and Testing of large C++ Projects", EPJ Web of Conferences, vol. 245, pp. 1-6, year 2020.
(Continued)

*Primary Examiner* — Gregory A Kessler
(74) *Attorney, Agent, or Firm* — Kligler & Associates Patent Attorneys Ltd

(57) ABSTRACT

An apparatus includes a memory and one or more processors. The one or more processors are configured to receive a first computing task for execution, and, during execution of the first computing task (i) to monitor Operating System (OS) calls issued by the first computing task, (ii) to identify, based on the monitored OS calls, one or more outputs produced by the first computing task, and (iii) and to store the one or more outputs of the first computing task in the memory. The one or more processors are further configured to receive a second computing task for execution, and, upon ascertaining that the second computing task will produce at least one output that is identical to a stored output of the first computing task, to reuse the stored output of the first computing task as an output or the second computing task.

26 Claims, 2 Drawing Sheets

(56) References Cited

OTHER PUBLICATIONS

Bellal et al., "CoxNet: A Computation Reuse Architecture a the Edge", IEEE Transactions Green Communications and Networking, vol. 5, No. 2, p. 765-777, Jun. 5, 2021.
Nour et al., "A Network-based Compute Reuse Architecture for IoT Applications," arXiv:2104.03818, pp. 1-10, Apr. 8, 2021.
International Application # PCT/IB2022/051495 Search Report dated Jun. 6, 2022.

STORAGE AND REUSE OF COMPUTING-TASK OUTPUTS USING SYSTEM-CALL INTERCEPTION

FIELD OF THE INVENTION

The present invention relates generally to computing systems, and particularly to methods and systems for storing and reusing outputs of computing tasks.

BACKGROUND OF THE INVENTION

Various types of computing tasks employ caching of results for subsequent reuse. For example, an article by Matev, entitled "Fast distributed compilation and testing of large C++ projects,", $24^{th}$ International Conference on Computing in High Energy and Nuclear Physics, November, 2019, describes a distributed compilation server that performs pre-processing and caches compilation results for faster rebuilding. Another example pre-processing and caching scheme is described by Kirillov, in in "faster builds with the new Caching Shader Preprocessor (Experimental)," Unity Blog, May, 2020.

SUMMARY OF THE INVENTION

An embodiment of the present invention that is described herein provides an apparatus including a memory and one or more processors. The one or more processors are configured to receive a first computing task for execution, and, during execution of the first computing task (i) to monitor Operating System (OS) calls issued by the first computing task, (ii) to identify, based on the monitored OS calls, one or more outputs produced by the first computing task, and (iii) and to store the one or more outputs of the first computing task in the memory. The one or more processors are further configured to receive a second computing task for execution, and, upon ascertaining that the second computing task will produce at least one output that is identical to a stored output of the first computing task, to reuse the stored output of the first computing task as an output of the second computing task.

In some embodiments, the one or more processors are configured to ascertain that the at least one output of the second computing task will be identical to a stored output of the first computing task, by: identifying, based on the OS calls monitored during execution of the first computing task, one or more inputs fetched by the first computing task; and ascertaining that (i) a current version of the one or more inputs is identical to the one or more corresponding inputs that were fetched by the computing task, and that (ii) at least one operation, which produces the at least one output from the one or more inputs, is identical in the first and second computing tasks.

In an example embodiment, the one or more processors are configured to compare between (i) one or more first signatures calculated over the current version of the one or more inputs and (ii) one or more second signatures calculated over the one or more corresponding inputs that were fetched by the first computing task, in order to ascertain that the current version is identical to the inputs fetched by the first computing task.

In another embodiment, the one or more processors are configured to identify only inputs of the first computing task that affect one or more of the outputs of the first computing task. In yet another embodiment, the one or more processors are configured to execute the second computing task upon finding that the at least one operation differs between the second computing task and the first computing task, or that the current version of the one or more inputs differs from the one or more corresponding inputs that were fetched by the first computing task.

In a disclosed embodiment, the first computing task includes a hierarchy of multiple software processes, and the one or more processors are configured to identify the hierarchy of the multiple processes and to accumulate at least some of the inputs fetched by the multiple processes. In an example embodiment, the first computing task includes one or more software processes, and the one or more processors are configured to identify the inputs fetched by the first computing task, by monitoring the OS calls issued by the processes to an OS. In an embodiment, the second computing task includes one or more software processes, including a given process in which a given input becomes available only during execution, and the one or more processors are configured to run the given process at least until the given input is available, and then decide, based on the given input, whether to abort the given process and reuse a stored output from the first computing task.

In some embodiments, the one or more processors are configured to monitor the OS calls by injecting, into the first computing task, program code that intercepts the OS calls issued by the first computing task to an OS. In an example embodiment, the first computing task includes a hierarchy of multiple software processes, and the one or more processors are configured to inject the program code that intercepts the OS calls into the multiple software processes. In another embodiment, the one or more processors are configured to ascertain that the second computing task produce at least one output that is identical to a stored output of the first computing task, by comparing first and second signatures calculated over at least respective command lines of the first and second computing tasks.

In some embodiments, in addition to reusing the stored outputs of the first computing task, the one or more processors are configured to reconstruct additional data that is required for subsequent usage of the outputs of the second computing task by a target process. In an embodiment, the one or more processors are configured to indicate to the target process that the second computing task has completed execution, even though the second computing task was not executed and the outputs of the second computing task comprise the stored outputs of the first computing task.

There is additionally provided, in accordance with an embodiment of the present invention, a method including receiving a first computing task for execution, and, during execution of the first computing task, (i) monitoring Operating System (OS) calls issued by the first computing task, (ii) identifying, based on the monitored OS calls, one or more outputs produced by the first computing task, and (iii) storing the one or more outputs of the first computing task in the memory. A second computing task is received for execution. Upon ascertaining that the second computing task will produce at least one output that is identical to a stored output of the first computing task, the stored output of the first computing task is reused as an output of the second computing task.

The present invention will be more fully understood from the following detailed description of the embodiments thereof, taken together with the drawings in which:

DETAILED DESCRIPTION OF EMBODIMENTS

Overview

Figure 1:
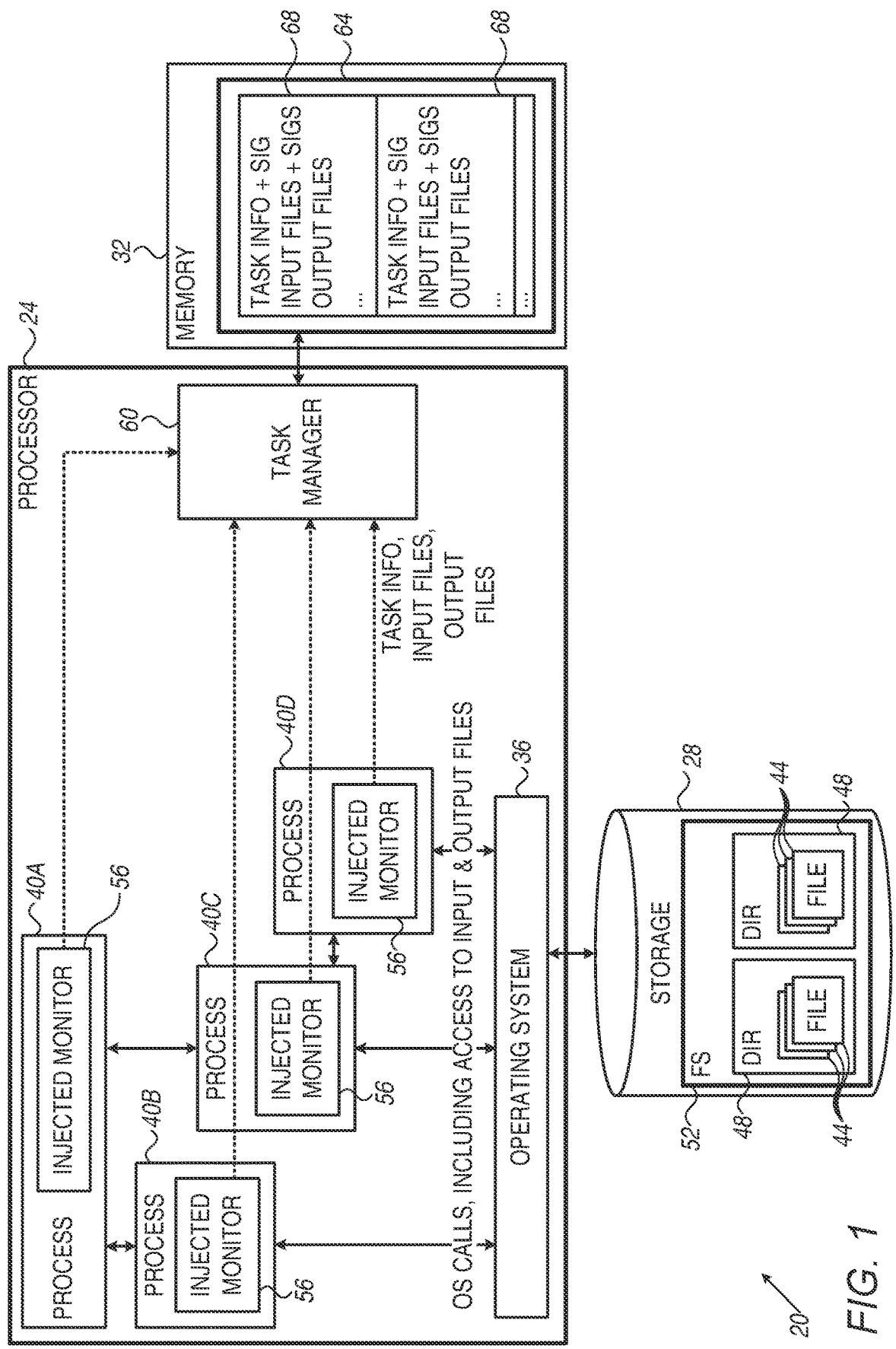
FIG. 1 is a block diagram that schematically illustrates a computing system that employs storage and reuse of computing-task outputs using system-call interception, in accordance with an embodiment of the present invention.

Embodiments of the present invention that are described herein provide methods and systems for efficiently carrying out computing tasks. As will be explained in detail below, the disclosed techniques store outputs of previously-executed computing tasks, and reuse a stored output of a previously-executed computing task upon identifying that a new computing task will generate an identical output.

In one example scenario, a new computing task will generate outputs identical to the outputs of a previous computing task if (i) both computing tasks specify the same operation (e.g., the same command line including command-line parameters), and (ii) the inputs required by the new computing task (or at least the inputs that affect the outputs)) are the same as the stored outputs of the previous computing task. For deterministic computing tasks (i.e., computing tasks that produce the same outputs given the same inputs) these conditions guarantee that the stored outputs of the previous computing task can be reused safely as outputs of the new computing task. Specific examples of input and output types are given further below.

The disclosed techniques, however, are not limited to cases in which the previous task and the new task perform the exact same operation, have the exact same inputs and produce the exact same outputs. More generally, it is sufficient that the new task will generate at least one output that is identical to a stored output of a previous task. In any such case, the stored output of the previous task can be reused as an output of the new task, thereby obviating the need to re-calculate this output by the new task. If all the outputs of a new task can be obtained from stored outputs of one or more previous tasks, the new task need not be invoked at all.

Put in another way, the disclosed techniques typically consider inputs that are "meaningful" or "relevant" to the output, as opposed to inputs that do not affect the output such as ignorable command-line switches. Some outputs may also be non-meaningful and therefore can be discarded from the caching process. One example is a log file that may differ from one invocation to another.

In some embodiments, the disclosed techniques identify that a stored output of a previous task can be reused as an output of a new task by:

Identifying one or more of the inputs fetched by the previous task during its execution, and storing signatures of the identified inputs.

Using signature comparisons, ascertaining that the current version of these inputs (or at least one or more of the inputs that affect the output in question) is identical to the corresponding inputs that were fetched by the first computing task.

Ascertaining that the operation or operations (e.g., the command-line and command-line parameters), which produce the output in question from the inputs, are identical in the new task and in the previous task.

In order to verify whether the inputs and associated operations (e.g., command-line and parameters) of the two computing tasks are the same, signatures (e.g., hash values) of the inputs and associated operations of the previous computing task may be stored as well, and compared with respective signatures of the new computing task.

An important property of the disclosed techniques is that the inputs and outputs of a computing task (e.g., lists of input files and output files) are identified on-the-fly, i.e., during execution of the computing task, by intercepting Operating System (OS) calls made by the computing task. Non-limiting examples of OS calls, which can be used for identifying inputs and outputs, include File System (FS) access, registry access and network access calls.

Identifying inputs and outputs of a computing task using OS-call interception is highly effective, for example because it does not require any pre-processing or prior knowledge regarding the computing task dependencies. In a compilation application, for example, there is no need to edit the source code of the compiler product in order to offer a cache and re-use solution for the compiler outputs. As such, the disclosed techniques can be used with tasks and tools that do not support pre-processing services. When used with tasks and tools that do support pre-processing services, the disclosed techniques enable skipping the pre-processing stage, thereby reducing latency and saving computational resources.

In some embodiments, the OS calls made by computing tasks are identified by injecting dedicated software code (referred to herein as "monitoring code") into the processes that run the computing tasks. Alternatively, other techniques, e.g., monitoring OS calls by a dedicated driver, can also be used for identifying OS calls issued by a computing task or process.

In various embodiments, the computing system may comprise one or more processors or various types, e.g., one or more Central Processing Units (CPUs, e.g., Intel and/or ARM CPUs), Graphics Processing Units (GPUs), Accelerated Processing Units (APUs) and/or any other suitable processor type. Computing tasks may be executed by one or more processes that run on the one or more processors. In the present context, the terms "storage" and "caching" are used interchangeably.

Typically, each computing task (also referred to as a "job") comprises a main process that in turn invokes one or more other processes in accordance with a defined hierarchy (sometimes referred to as a "process tree"). The processes in the process tree may be direct or indirect descendants of the main process. A certain process in the process tree can be a child of one process, and at the same time a parent of another process. Suitable monitoring code is injected into each of the processes. As will be explained below, part of the functionality of the disclosed techniques is to identify the process tree based on the monitored OS calls.

Consider a certain process in the process tree (referred to as "parent process") that at some stage invokes another process (referred to as "child process"). In an example flow, the injected monitoring code in the parent process intercepts the OS call that invokes the child process. From the intercepted OS call, the monitoring code in the parent process determines whether the expected outputs of the child process are identical to any cached outputs. For example, the monitoring code may query the cache with the signatures of the inputs and operation (e.g., command line) of the child process, as derived from the OS call.

If the expected outputs of the child process are available in the cache, the monitoring code prevents invocation of the child process, and instead reuses the cached outputs. The monitoring code provides the parent process with results and user messages (e.g., Stdout and Stderr) that appear as if the child process was invoked and executed (e.g., a suitable exit code and output data), even though the results are derived from cached outputs of a previously-executed process. If (according the signatures of the inputs and operation) the expected outputs of the child process do not match any cached outputs, the monitoring code in the parent process enables execution of the child process, and caches the resulting outputs (and the corresponding signatures of the inputs) for future use.

Other example flows are also contemplated. For example, the child process may obtain some or all of its inputs after it begins running (a scenario that is referred to herein as "delayed inputs"). In such a case, in which one or more inputs are available only during execution of the child process, the monitoring code in the parent process may allow the child process to begin running, at least until the relevant inputs are unavailable. At this stage the monitoring code in the parent process is able to decide whether the expected outputs of the child processes are available in the cache or not. If available, the monitoring code in the parent process terminates the child process and provides the parent process with results derived from the cached outputs. This solution saves the time that would be needed to fully execute the child process.

In some embodiments, the caching and reuse techniques described herein can be applied not only to computing tasks that have completed successfully, but also to computing tasks that have failed.

The methods and systems described herein are suitable for various kinds of computing tasks. Since the disclosed techniques are generic and do not rely on a specific service or on familiarity with specific tools, they can be used in a variety of use-cases in which a particular input will result in a particular output. Only minimal adaptation of the disclosed techniques, if at all, is needed to suit a particular use-case or application. Moreover, the disclosed techniques are typically implemented with little or no intervention in the on-going operation of the computing tasks being cached and reused.

Non-limiting examples of computing tasks include software compilation, image rendering, unit testing, integration testing and other types of testing, code analysis, code signing, code obfuscation, packaging, compression, encoding, simulations, general calculations, AI and machine learning calculations, 3D modeling, shader compilation, lightmap baking, video processing, encryption, scientific executions, and many others. Several example use-cases are described in greater detail below.

System Description

FIG. 1 is a block diagram that schematically illustrates a computing system 20 that employs caching and reuse of computing-task outputs using OS-call interception, in accordance with an embodiment or the present invention. In the present example system 20 comprises a processor 24, a storage subsystem 28 and a memory 32. Processor 24 runs a suitable Operating System (OS) 36.

As will be elaborated below, the system configuration seen in FIG. 1 is one non-limiting example implementation. In alternative embodiments the disclosed techniques can be used in various other system configurations, e.g., virtualized environments, systems comprising multiple processors, systems comprising multiple storage components such as filesystem and registry, networked systems, cloud-based systems, or any other suitable configuration. The description that follows refers to a centralized, single-processor system, purely for the sake of clarity.

In various embodiments, processor 24 may be configured to execute various types of computing tasks (referred to herein simply as "tasks" for brevity). One typical example, which is by no means limiting, is a compiler process that compiles source code so as to produce intermediate and executable object code. Alternatively, the disclosed techniques can be used with any other suitable kind of computing tasks.

The embodiments described herein refer mainly to deterministic computing tasks, i.e., tasks that are guaranteed to produce the same outputs given the same inputs. The disclosed techniques, however, can in some cases be used with non-deterministic tasks, as well. For example, a task may have both deterministic and non-deterministic outputs, in which case the disclosed techniques can be applied to the subset of deterministic outputs. As another example, a non-deterministic output may be of a very small of possible values, in which case it may be worthwhile to cache the various possible outputs and choose the correct one per invocation, if possible.

Moreover, the examples described herein mainly consider tasks that produce outputs that are binary-identical to one another. The disclosed techniques, however, can in some cases be used with tasks that produce outputs that are functionally-equivalent but not necessarily binary-identical. In the context of the present patent application and in the claims, the term "identical outputs" refers both to outputs that are binary-identical, and to outputs that are functionally-equivalent but not binary-identical. Similarly, the term "identical inputs" refers both to inputs that are binary-identical, and to inputs that are functionally-equivalent but not binary-identical.

Processor 24 executes computing tasks by running one or more software processes 40 (referred to herein simply as "processes" for brevity). In some cases each process 40 corresponds to a respective computing task. In other cases a given computing task is executed by multiple processes 40, e.g., by a main process that invokes one or more child processes. The processes belonging to a given task may be direct or indirect descendants of the main process. The hierarchy of the processes in a given task is referred to as a "process tree." The example of FIG. 1 illustrates a process tree comprising four processes denoted 40A-40D. Process 40A is the main process. Processes 40B and 40C are child processes of process 40A. Process 40D is a child process of process 40C (and an indirect descendant of process 40A).

A computing task (e.g., a compilation task or any other) is typically specified by a task definition, e.g., a command-line, which defines the required operation and possibly one or more parameters. The parameters may comprise, for example, command-line switches, environment variables and the like. During execution, the computing task reads one or more inputs, e.g., reads data from input files (or folders, or registry, or any other suitable input type), and writes one or more outputs, e.g., writes data to output files (or folders, or registry, or any other suitable output type). In the example of FIG. 1, the input files and the output files of the various computing tasks comprise files 44 stored in one or more directories 48 of a File System (FS) 52 in storage subsystem 28.

More generally, inputs of computing tasks may comprise, for example, a command line, executable files for the various processes that participate in the task execution, and the libraries being used, specified File lists (e.g., files passed in the command line), unspecified file lists (e.g., files known from previous executions, such as header files), missing files (e.g., files known from previous executions, such as configuration files), registry, environmental variables, or any other suitable input. Outputs of computing tasks may comprise, for example, output files and folders (including file deletions), standard output (Stdout), standard error (Stderr), process exit code, network packets (e.g., rest calls), pipes or Inter-Process Communication (IPC) calls to other processes (e.g., database calls), changes to environment variables, or any other suitable output. The description that follows refers mainly to input and output files, by way of example.

Typically, in order to read input data for a computing task, a process 40 belonging to the task issues one or more "system calls" (also referred to herein as "OS calls") to OS 36. A given OS call specifies, inter alia, an input file from which data is to be read. OS 36 serves such a system call by accessing the specified file in 52, and forwarding the input data (typically a pointer or handle pointing to the data) to the requesting process 40. In order to write output data produced by a computing task, the corresponding process 40 typically issues one or more system calls to OS 36, each OS call specifying, inter alia, an output file to which data is to be written OS 36 serves the system call by writing the data to the specified file in FS 52. More generally, possible types of OS calls may comprise calls that access FS 52, calls that access the registry of OS 36, calls that request network access, and/or any other suitable type of OS call that reads or writes data.

In many practical scenarios, the same computing task may be received for execution multiple times. For example, a compiler may be invoked to compile the same source file multiple times. Instead of executing the same task multiple times, it is highly advantageous to identify such a scenario and reuse the results of a previously-executed task. More generally, in various cases it is known in advance that a new computing task will produce an output that is identical to an output of a previously-executed task. In any such case, it is advantageous to reuse the output of the previously-executed task instead of having the new task calculate and generate this output again.

To this end, processor 24 further runs the following software components

Injected monitors 56 (also referred to herein as "monitoring code")—Dedicated software code that is injected into processes 40. In a given process 40, the corresponding monitor 56 intercepts OS calls that are issued by the process to OS 36. Monitor 56 identifies OS calls that request reading and writing of data, and extracts the names (typically with full paths) of input files and output files (or other types of inputs and outputs, as applicable) from these OS calls. In some embodiments, monitor 56 also intercepts OS calls that create child processes, in order to inject monitoring code into the child processes as well.

A task manager 60—A software component that uses the information intercepted by monitors 56 to cache (store) previously-executed tasks and reuse the cached information in new tasks.

In some embodiments, task manager 60 caches the information in a suitable in-memory database 64 in memory 32. Database 64 comprises one or more entries 68. Each entry 68 comprises the following information:

Task_info: The task definition (e.g., command line and any command-line parameters), plus a task signature calculated over at least part of the task definition. The task signature is used as a key for querying database 64. Any suitable type of signature, e.g., hash, can be used. The task signature is typically calculated over the part of the task definition that affects the task outputs. Parts of the task definition that do not affect the output, e.g., some command-line switches, are typically excluded from the task signature.

A list of (one or more) input files or other inputs read by the task, and respective signatures calculated over at least some of the inputs. In one embodiment the signatures comprise MD5 hash values calculated over the inputs. Alternatively, any other suitable signature can be used. The signature may be a standard known signature, e.g., MD5 or SHA, or a proprietary signature, e.g., a signature designed for a particular input type. In some embodiments, the list of input files excludes input files that do not affect the outputs of the task. The signatures, too, are typically calculated only over the inputs that affect the outputs.

A list of (one or more) output files or other outputs produced by the task.

The structure of database 64 seen in FIG. 1 is a highly simplified structure that is chosen purely for the sake of clarity. In alternative embodiments, database 64 may be implemented in any other suitable way, e.g., using databases, and/or in a centralized or shared configuration in one embodiment, database 64 is split into (i) a metadata database comprising the task information structures, and (ii) a data database comprising the actual storage in which the input files and output artifacts (e.g., output files, exit code, Stdout, Stderr) are saved. Output files are typically saved in the database under different names. The translation into the original filenames is based on the respective task information.

In the present example, for the sake of clarity, all tasks run in the same processor. In alternative embodiments, a new task and a previously-executed task may run in different processors, e.g., on different hosts (or VMs or containers) connected by a network. Database 64 may provide caching services to such multiple processors, e.g., to multiple networked hosts.

Example Method Flow

Figure 2:
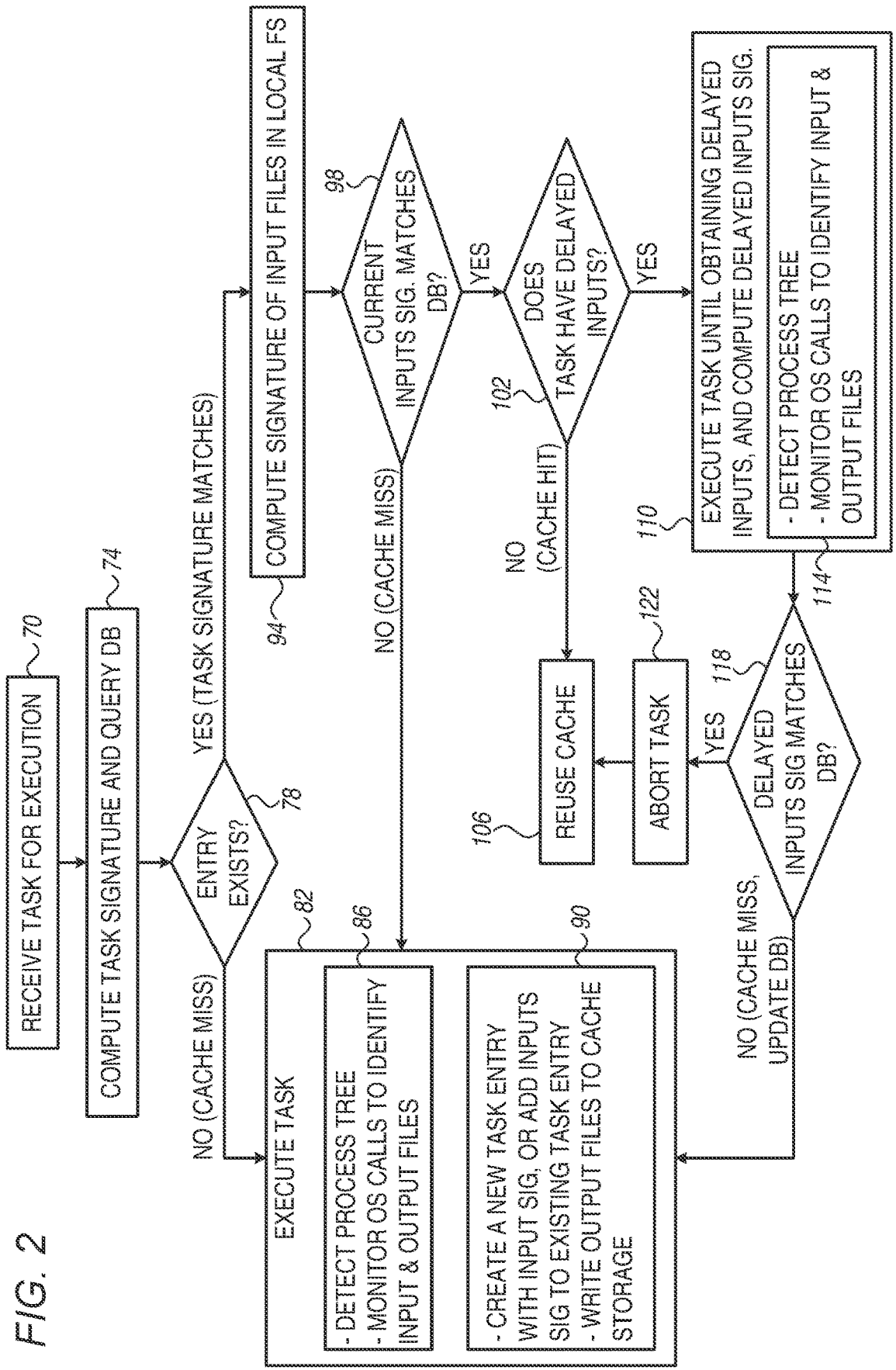
FIG. 2 is a flow chart that schematically illustrates a method for storage and reuse of computing-task outputs using system-call interception, in accordance with an embodiment of the present invention.

FIG. 2 is a flow chart that schematically illustrates a method for caching of computing-task outputs using OS-call interception, in accordance with an embodiment of the present invention. The method begins with task manager 60 receiving a new computing task for execution, at a task reception step 70. At a querying step 74, task manager 60 calculates the task signature over the relevant task definition (e.g., over the parts of the task command line that affect the task outputs), and queries database 64 with the task signature.

At an entry checking step 78, task manager 60 checks whether database 64 comprises an entry 68 whose task signature matches the task signature of the new task.

If the outcome of step 78 is that database 64 does not comprise a matching entry, task manager 60 begins a "cache miss" flow. The task manager allows the main process 40 of the new task to begin executing the task, at an execution step 82. During execution of the new task, at a process detection and monitoring step 86, injected monitor 56 of the main process identifies the process tree of the new task, including any direct and indirect descendants of the main process, by intercepting and replacing the process creation function. Injected monitor 56 of the main process injects monitoring code 56 into the processes in the identified process tree. Then, injected monitor 56 within each process monitors the OS calls issued by the process.

As part of monitoring the OS calls, monitor 56 in each process typically identifies the input files and output files (or other suitable inputs and outputs) accessed by the process 40. Monitor 56 reports the identified input files and output files to cask manager 60. At an entry creation 90, task manager 60 creates a new entry 68 in database 64 for the new task. Task manager 60 caches in the new entry (i) the task information and corresponding task signature, (ii) the list of identified input files as reported by monitor 56 (or at least the input files that affect the outputs), (iii) respective signatures (e.g., MD5 hash values) computed over the input files, and (iv) the list of identified output artifacts (e.g., output files, exit code, Stdout, Stderr) as reported by monitor 56.

If, on the other hand, the outcome of step 78 is that database 64 already has an entry 68 whose task signature matches the task signature of the new task, task manager 60 proceeds to a signature calculation step 94, in which it calculates respective signatures (e.g., MD5 hash values) over the current input files on the list of the task (e.g., as they now exist in FS 52, or over the network or other location). At an input checking step 98, task manager 60 checks whether the current signatures of the input files match the corresponding signatures cached in the matching entry 68 of database 64.

If at least one of the input-file signatures does not match, the cached outputs cannot be reused as the outputs of the new task. In such an event, task manager 60 proceeds to the cache-miss flow of step 82 and allows the process tree to execute the new task.

Note that in the latter case, the task signature was found to match an entry 68 in database 64 but a mismatch was found for at least one of the input-file signatures. Nevertheless, in some embodiments, task manager 60 does not delete the existing entry 68. As will be seen below, this feature permits the database to hold multiple alternative input lists (and thus multiple alternative different cached outputs) associated with the same entry (same task signature).

Referring now back to step 98—If, on the other hand, the current signatures of the input files match the corresponding cached signatures, task manager 60 checks whether the new task has delayed inputs, at a delayed input checking step 102. In the present context, the term "delayed inputs" refers to inputs that are obtained by a process after it begins running. If no delayed inputs are expected, task manager 60 prevents the process 40 from executing the new task, at a re-use step 106. Instead, task manager 60 retrieves the cached outputs of the previous task from database 64, and reuses the cached outputs as the out of the new task.

In some embodiments, when a parent process 40 in the process tree reuses cached outputs instead of running a child process 40, monitoring code 56 in the parent process provides the parent process with the cached outputs, in a way that appears as if the child process was invoked and executed. For example, monitoring code 56 in the parent process may provide the parent process with a suitable exit code of the child process, as well as Stdout and Stderr written to the proper locations expected by the parent process.

In some embodiments, user messages (e.g., Stdout and Stderr) of the process are also stored in database 64 (at step 90). In case of cache hit, i.e., when reusing cached outputs at step 106, monitoring code 56 may retrieve the cached user messages and provide them to the parent process, in order to preserve the original user experience.

In some embodiments, when reusing the cached outputs of a previous computing task in a new computing task, task manager 60 reconstructs additional data that is required for using the outputs by a target process (e.g., a parent process). The reconstruction may be performed, for example, upon completing a task or a series of tasks (e.g., a project). Before providing the outputs to the target process, the task manager typically formats the cached outputs and the additional data in a format that resembles that of a completed task. In this manner, the target process is typically unaware of the fact that the new computing task was not executed, and that outputs it receives are reused from a previous task. In some embodiments, task manager 60 indicates to the target process that the new computing task has completed execution, even though the new computing task was not executed at all.

Referring now back to step 102—If the task is found to have one or more delayed inputs, task manager 60 proceeds to a limited execution step 110. In this step, the task is allowed to execute up to the stage in which the delayed inputs (or at least those that affect the outputs) are obtained by injected monitor 56. Task manager 60 calculates the signatures of the delayed inputs being obtained.

At a detection and monitoring step 114 (similar to step 86 above) monitoring code 56 of a process identifies the process tree, and injects monitoring code 56 into the identified child processes. Injected monitor 56 within each process monitors the OS calls issued by the process so as to identify the inputs and outputs. At a delayed input checking step 118, task manager 60 checks, whether the current signatures of the delayed inputs match the corresponding signatures cached in the matching entry 68 of database 64. If so (i.e., upon cache hit) monitoring code 56 (in the parent process or in the child process) aborts the task, at an aborting step 122, and proceeds to reuse step 106. If not (i.e., upon cache miss) monitoring code 56 proceeds to execution step 82.

The configuration of system 20 shown in FIG. 1, and the method flow shown in FIG. 2, are non-limiting examples that are chosen purely for the sake of conceptual clarity. In alternative embodiments, any other suitable configurations and flows can be used.

For example, as noted above, system 20 may comprise a virtualized environment, a system comprising multiple processors, a networked system or a cloud-based system. Any process 40 may run on a "bare-mal" processor, in a Virtual Machine (VM), in a container, or in any other suitable way. The inputs and outputs of the computing tasks may comprise any suitable types of inputs and outputs, e.g., files, directories, objects and the like.

OS 36 may comprise any suitable type of OS, e.g., Linux, Windows or Mac OS. Database 64 may be centralized (e.g., local) or shared (i.e., distributed). FS 52, too, may be centralized (e.g., local) or shared (i.e., distributed). In some embodiments, task manager 60 may handle different processes 40 that run under different operating systems 36, possibly of different types.

In some embodiments system 20 may comprise multiple instances of database 64, e.g., a local instance plus one or more remote instances. The different instances may be collocated or dispersed geographically. In some embodiments, task manager 60 and/or monitoring code 56 may use OS triggers to detection modifications of local input files. This detection enables faster validation of input files. In some embodiments, instead of copying files upon cache hit, task manager 60 may use soft links from project to local cache.

The different system elements seen in FIG. 1 may be implemented using software, using suitable hardware, or using a combination of software and hardware elements. For example, storage subsystem 28 may comprise one or more magnetic or solid-state storage devices. Memory 32 may comprise, for example, one or more Random Access Memory (RAM) devices.

In some embodiments, processor 24 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Example Use-Cases and Applications

As noted above, the disclosed techniques can be used with various kinds of computing tasks, in a wide variety of use-cases and applications. Several non-limiting examples include:

Software compilation. In this application the inputs typically comprise files containing source code and parameters. The outputs typically comprise files containing executable code (object code) and/or any intermediate outputs such as obj files, pdb files, tlb files, etc.).

Software testing. Example testing applications include software unit tests, integration tests, API tests, or any other suitable testing type. In these applications, inputs typically comprise input files and commands, and outputs typically comprise output files and text indicating test success/failure.

Graphics rendering. In this application the inputs typically comprise input data (files and command line) and the outputs typically comprise output files.

Numerous other applications, e.g., financial Simulations, risk analysis, 3D model executions, code analysis, packaging, code signing, code obfuscation, CAD/CAM simulations, Monte-Carlo simulations, shader compilation, lightmap baking, compression, encoding, encryption, data conversion, rendering, and many others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
 a memory; and
 one or more processors, configured to:
  receive a first computing task for execution;
  during execution of the first computing task, (i) monitor Operating System (OS) calls issued by the first computing task, (ii) identify, based on the monitored OS calls, one or more outputs produced by the first computing task, and (iii) store the one or more outputs of the first computing task in the memory;
  receive a second computing task for execution; and
  upon ascertaining that the second computing task will produce at least one output that is identical to a stored output of the first computing task, reuse the stored output of the first computing task as an output of the second computing task.

2. The apparatus according to claim 1, wherein the one or more processors are configured to ascertain that the at least one output of the second computing task will be identical to a stored output of the first computing task, by:
 identifying, based on the OS calls monitored during execution of the first computing task, one or more inputs fetched by the first computing task; and
 ascertaining that (i) a current version of the one or more inputs is identical to the one or more corresponding inputs that were fetched by the first computing task, and that (ii) at least one operation, which produces the at least one output from the one or more inputs, is identical in the first and second computing tasks.

3. The apparatus according to claim 2, wherein the one or more processors are configured to compare between (i) one or more first signatures calculated over the current version of the one or more inputs and (ii) one or more second signatures calculated over the one or more corresponding inputs that were fetched by the first computing task, in order to ascertain that the current version is identical to the inputs fetched by the first computing task.

4. The apparatus according to claim 2, wherein the one or more processors are configured to identify only inputs of the first computing task that affect one or more of the outputs of the first computing task.

5. The apparatus according to claim 2, wherein the one or more processors are configured to execute the second computing task upon finding that the at least one operation differs between the second computing task and the first computing task, or that the current version of the one or more inputs differs from the one or more corresponding inputs that were fetched by the first computing task.

6. The apparatus according to claim 2, wherein the first computing task comprises a hierarchy of multiple software processes, and wherein the one or more processors are configured to identify the hierarchy of the multiple processes and to accumulate at least some of the inputs fetched by the multiple processes.

7. The apparatus according to claim 2, wherein the first computing task comprises one or more software processes, and wherein the one or more processors are configured to identify the inputs fetched by the first computing task, by monitoring the OS calls issued by the processes to an OS.

8. The apparatus according to claim 2, wherein the second computing task comprises one or more software processes, including a given process in which a given input becomes available only during execution, and wherein the one or more processors are configured to run the given process at least until the given input is available, and then decide, based on the given input, whether to abort the given process and reuse a stored output from the first computing task.

9. The apparatus according to claim 1, wherein the one or more processors are configured to monitor the OS calls by injecting, into the first computing task, program code that intercepts the OS calls issued by the first computing task to an OS.

10. The apparatus according to claim 9, wherein the first computing task comprises a hierarchy of multiple software processes, and wherein the one or more processors are configured to inject the program code that intercepts the OS calls into the multiple software processes.

11. The apparatus according to claim 1, wherein the one or more processors are configured to ascertain that the second computing task will produce at least one output that is identical to a stored output of the first computing task, by comparing first and second signatures calculated over at least respective command lines of the first and second computing tasks.

12. The apparatus according to claim 1, wherein, in addition to reusing the stored outputs of the computing task, the one or more processors are configured to reconstruct additional data that is required for subsequent usage of the outputs of the second computing task by a target process.

13. The apparatus according to claim 12, wherein the one or more processors are configured to indicate to the target process that the second computing task has completed execution, even though the second computing task was not executed and the outputs of the second computing task comprise the stored outputs of the first computing task.

14. A method, comprising:
receiving a first computing task for execution;
during execution of the first computing task, (i) monitoring Operating System (OS) calls issued by the first computing task, (ii) identifying, based on the monitored OS calls, one or more outputs produced by the first computing task, and (iii) storing the one or more outputs of the first computing task in the memory;
receiving a second computing task for execution; and
upon ascertaining that the second computing task will produce at least one output that is identical to a stored output of the first computing task, reusing the stored output of the first computing task as an output of the second computing task.

15. The method according to claim 14, wherein ascertaining that the at least one output of the second computing task will be identical to a stored output of the first computing task comprises:
identifying, based on the OS calls monitored during execution of the first computing task, one or more inputs fetched by the first computing task; and
ascertaining that (i) a current version of the one or more inputs is identical to the one or more corresponding inputs that were fetched by the first computing task, and that (ii) at least one operation, which produces the at least one output from the one or more inputs, is identical in the first and second computing tasks.

16. The method according to claim 15, wherein ascertaining that the at least one output of the second computing task will be identical to a stored output of the first computing task comprises comparing between (i) one or more first signatures calculated over the current version of the one or more inputs and (ii) one or more second signatures calculated over the one or more corresponding inputs that were fetched by the first computing task.

17. The method according to claim 15, wherein identifying the one or more inputs comprises identifying only inputs of the first computing task that affect one or more of the outputs of the first computing task.

18. The method according to claim 15, wherein and comprising executing the second computing task upon finding that the at least one operation differs between the second computing task and the first computing task, or that the current version of the one or more inputs differs from the one or more corresponding inputs that were fetched by the first computing task.

19. The method according to claim 15, wherein the first computing task comprises a hierarchy of multiple software processes, and wherein identifying the one or more inputs comprises identifying the hierarchy of the multiple processes, and accumulating at least some of the inputs fetched by the multiple processes.

20. The method according to claim 15, wherein the first computing task comprises one or more software processes, and wherein identifying the one or more inputs comprises monitoring the OS calls issued by the processes to an OS.

21. The method according to claim 15, wherein the second computing task comprises one or more software processes, including a given process in which a given input becomes available only during execution, and comprising running the given process at least until the given input is available, and then deciding, based on the given input, whether to abort the given process and reuse a stored output from the first computing task.

22. The method according to claim 14, wherein monitoring the OS calls comprises injecting, into the first computing task, program code that intercepts the OS calls issued by the first computing task to an OS.

23. The method according to claim 22, wherein the first computing task comprises a hierarchy of multiple software processes, and wherein injecting the program code comprises injecting the program code that intercepts the OS calls into the multiple software processes.

24. The method according to claim 14, wherein ascertaining that the second computing task will produce at least one output that is identical to a stored output of the first computing task comprises comparing first and second signatures calculated over at least respective command lines of the first and second computing tasks.

25. The method according to claim 14, and comprising, in addition to reusing the stored outputs of the first computing task, reconstructing additional data that is required for subsequent usage of the outputs of the second computing task by a target process.

26. The method according to claim 25, and comprising indicating to the target process that the second computing task has completed execution, even though the second computing task was not executed and the outputs of the second computing task comprise the stored outputs of the first computing task.

* * * * *